(12) United States Patent
Mackel et al.

(10) Patent No.: US 7,171,861 B2
(45) Date of Patent: Feb. 6, 2007

(54) DEVICE FOR MEASURING LOADS APPLIED TO ROTATING COMPONENTS

(75) Inventors: Jerry Mackel, Aachen (DE); Martin Fieweger, Herzogenrath-Kohlscheid (DE)

(73) Assignee: SMS Demag AG, Duesseldorf (DE)

( * ) Notice: Subject to any disclaimer, the term of this patent is extended or adjusted under 35 U.S.C. 154(b) by 45 days.

(21) Appl. No.: 10/486,532

(22) PCT Filed: Aug. 7, 2002

(86) PCT No.: PCT/EP02/08846

§ 371 (c)(1), (2), (4) Date: Aug. 16, 2004

(87) PCT Pub. No.: WO03/014685

PCT Pub. Date: Feb. 20, 2003

(65) Prior Publication Data

US 2004/0255694 A1   Dec. 23, 2004

(30) Foreign Application Priority Data

Aug. 10, 2001 (DE) ................. 101 39 524

(51) Int. Cl.
*G01L 3/02* (2006.01)
(52) U.S. Cl. ................. 73/862.193
(58) Field of Classification Search ........... 73/862.193, 73/862.338
See application file for complete search history.

(56) References Cited

U.S. PATENT DOCUMENTS 5,546,755 A * 8/1996 Krieger .................. 62/133

FOREIGN PATENT DOCUMENTS

| DE | 9857770 | 6/2000 |
|---|---|---|
| EP | 0291344 | 11/1988 |

* cited by examiner

*Primary Examiner*—Max Noori
(74) *Attorney, Agent, or Firm*—Abelman, Frayne & Schwab

(57) ABSTRACT

The invention relates to a measuring device for detecting loads, especially torque, bending moment, and axial force applied to rotating components such as shafts, spindles, and/or pins with which changes if length caused by load are measured and determined in a non-contact manner with aid of at least one resistance strain gauge fixed on the component. For a non-contact feeding of supply energy for the resistance strain gauge and a likewise non-contact transmission of measured values to an evaluation device, an electronic rotor mechanism is provided which is arranged in one or several protective ring(s) (1) that encompasses the resistance strain gauge. For improving accuracy of the measurement and the informative capacity of the measuring results of the measuring device, the protective ring(s) (1) is (are) so arranged on the component that they are supported on one side or are formed deformable with respect to the component.

6 Claims, 3 Drawing Sheets

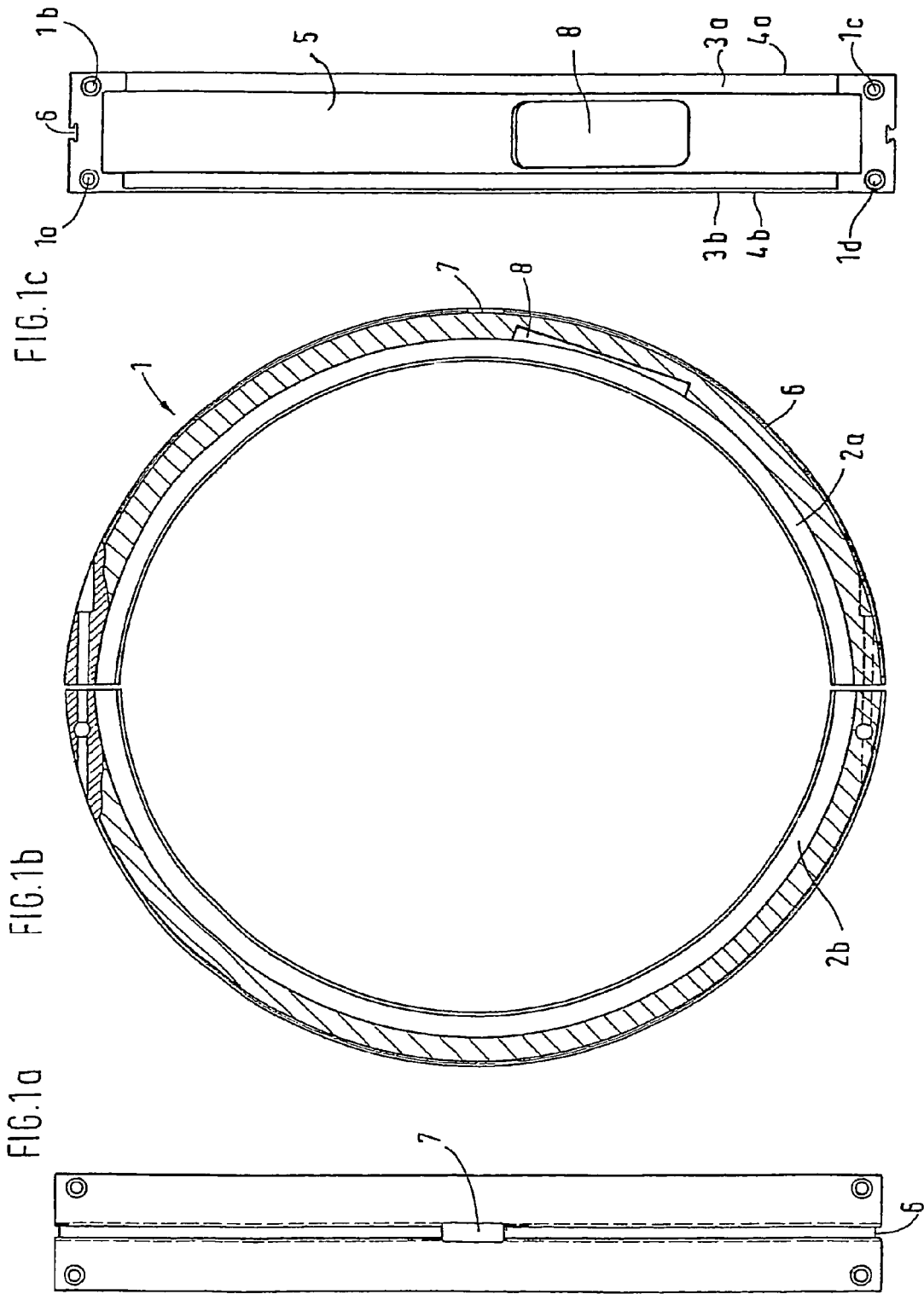

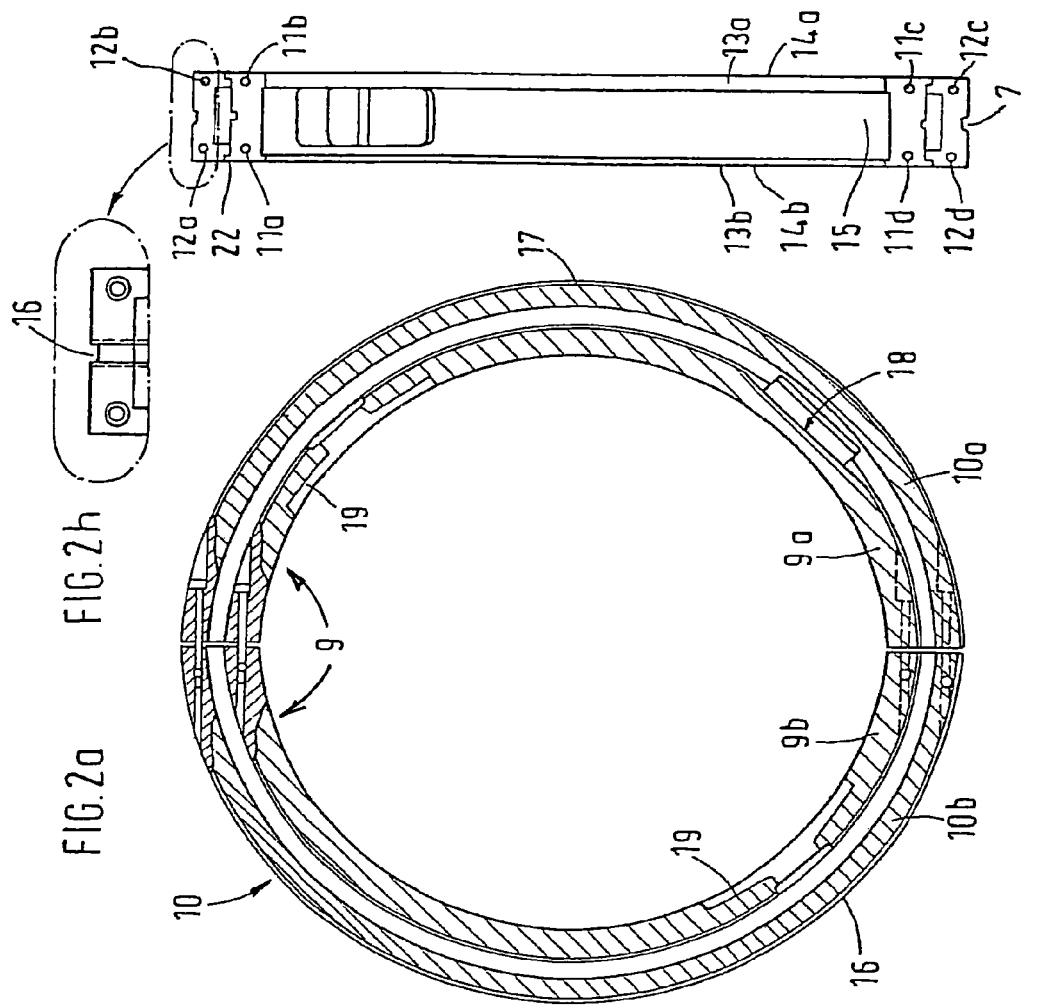
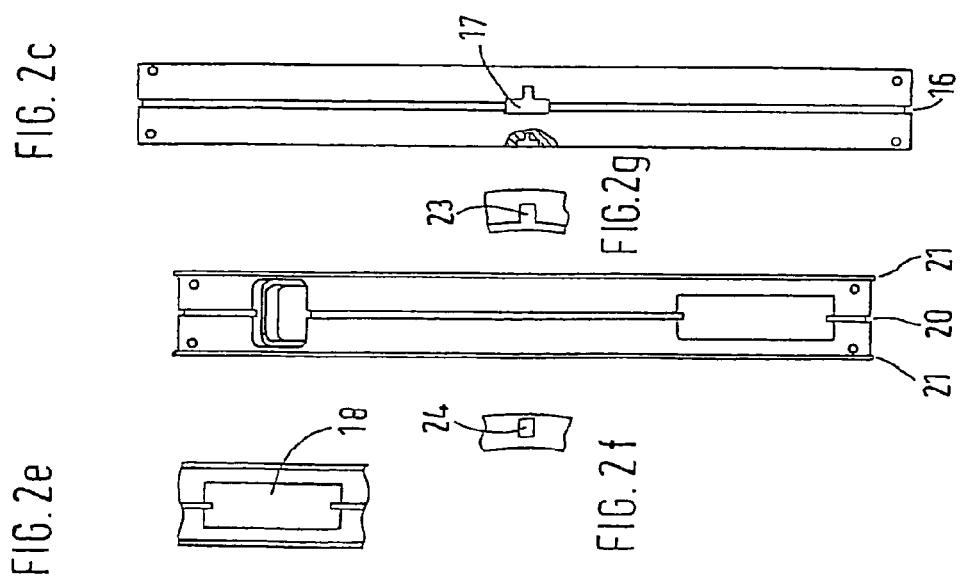

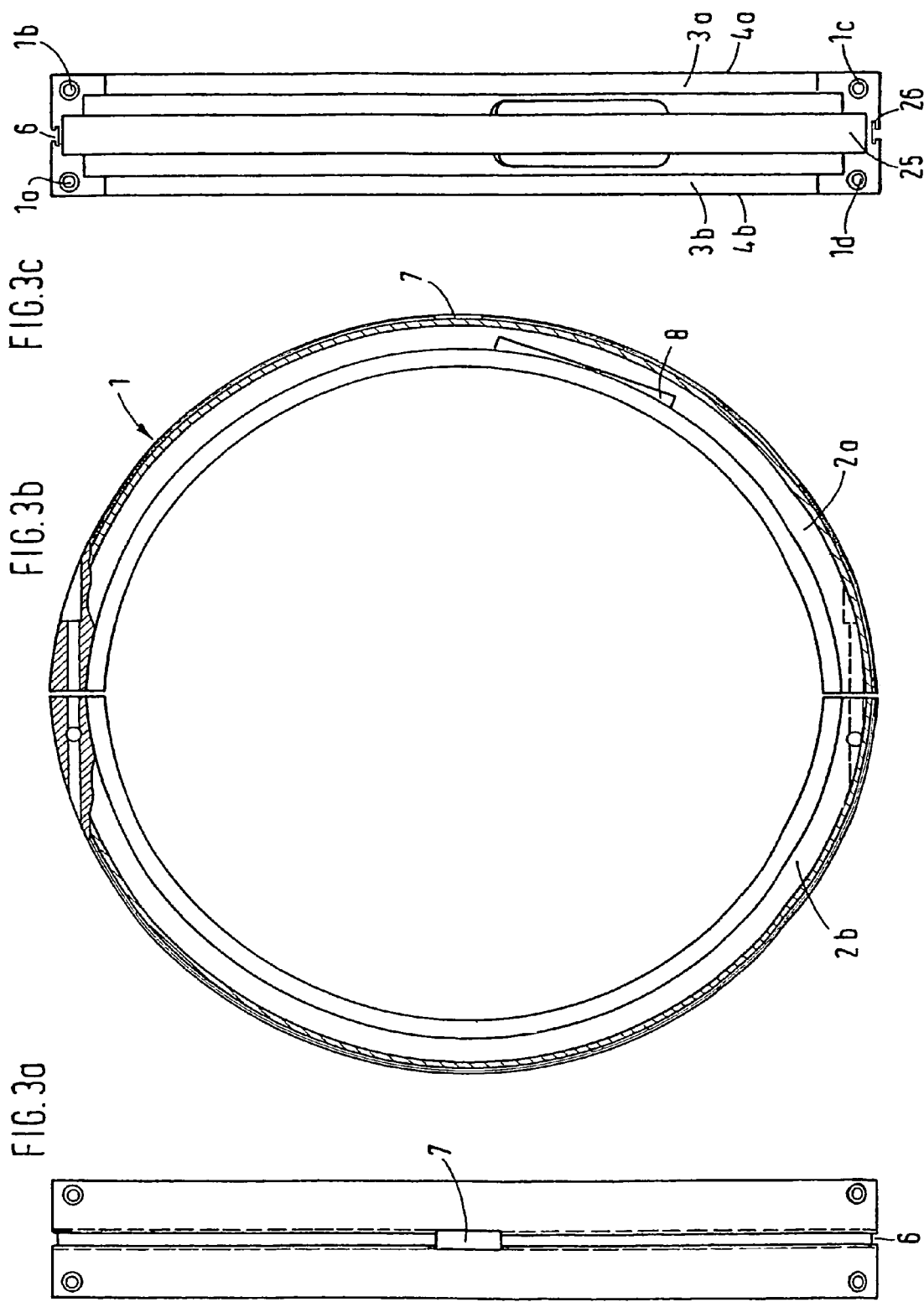

DEVICE FOR MEASURING LOADS APPLIED TO ROTATING COMPONENTS

The present invention relates to a measuring device for detecting loads, especially torque, bending moment and axial force applied to rotating components such as shafts, spindles, and/or pins with which changes in length caused by the load are measured and determined in a non-contact manner with aid of a resistance strain gauge fixed on the component, wherein for a non-contact feeding of supply energy for the resistance strain gauge and a likewise non-contact transmission of measured values to an evaluation device, an electronic rotor mechanism is provided which is arranged in one or several protective ring(s) that encompasses the resistance strain gauge.

An elastic deformation of a component, which is caused by application of a load, results in a change of length of one or more resistance strain gauge(s) secured on the component. By using their proportional change in resistance, the load is measured by an electronic rotor mechanism rotating with the component, wherein the electronic rotor mechanism provides for a non-contact transmission of the measuring value to a static evaluation unit and a likewise non-contact feeding of supply energy to the resistance strain gauge. The electronic rotor mechanism, a sending and receiving antenna, which forms a part thereof, and cable connections thereof are arranged in one or several rings that encompass the resistance strain gauge or gauges. The ring(s) perform both a system support function and a protective function.

Measuring devices of the above-described type are used with the rotating components, such as shafts, spindles, or pins when other measuring method cannot be used often because of bad environmental conditions. It is common in measuring technology to determine elastic changes of the shape of a component, which are caused by acting thereon forces, by using resistance strain gauges the elastical resistance of which is being measured. The changes in length of a resistance strain gauge, which is connected with a component (i.e., is glued, clamped, or welded thereto), lead, upon changes in shape of the component, to change in electrical resistance the magnitude of which is a measure of the applied load and of the elastic deformation of the component. The load-proportional resistance changes are measured with a bridge circuit.

These known measuring methods are also used for measuring torques when a resistance strain gauge is glued to the surface of a corresponding component, and the obtained change in length resulting from transverse strain at 45° to the circumference is determined by the load-proportional change in resistance. The bending moments and axial forces are determined in analogous manner but with a different positioning of the resistance strain gauges and a corresponding measuring bridge circuit. The ratio between the load applied to the component and the determined change in resistance in the resistance strain gauge is calculated by calculating the deformation based on the component geometry and the component material, or is determined using calibration, i.e., by applying a predetermined pressure and adjusting the measurement results. With a simple component geometry, the calculation of the deformation is effected by using conventional equations of strength of materials, or with another component geometry, calculations are performed using the finite element method.

Usually, the resistance strain gauges are connected with an electronic rotor mechanism that is arranged in one or several rings which surround the resistance strain gauges and simultaneously protect from environmental influences. In order to provide a measuring system with an adequate mechanical protection, the rings are formed as a massive part from plastic material, composite material, or metal, in extreme cases, always from steel or aluminum, with at least the ring, which carries the antenna, being formed of a non-conductive material. The ring, which is mounted on a component, has also a purpose of surrounding the resistance strain gauge to protect it. In addition, it carries electronic components of the measuring device. They can also be mounted on one or several additional ring(s), dependent on constructional or operational requirements. They can be mounted on a first ring which surrounds the resistant strain gauge, or be mounted directly on the component, axial offset with respect to the ring. Likewise, the resistance strain gauges can form a measuring bridge and be distributed on several rings, according to a measuring task. As a protection against penetration of fluids such as lubricants or water, the rings are provided, on their component side, with a sealing surface. Upon mounting, the rings surround the components and are tightened so that the sealing surface is pressed against the component surface. It is common to fill the space between the sealing surface and the component with a sealing material such as a hardenable silicon or elastomer. In order to achieve an adequate sealing and to prevent the ring or rings from slippage during operation, the sealing surface is formed sufficiently large and during tightening, an increased surface pressure between the sealing surface and the component is produced. For tightening the ring or rings, they are formed of two or more ring segments. The tightening or preload force in produced upon tightening of the ring segments, e.g., screwing them with each other.

It has been found out that with conventional rings, upon tightening of the ring or rings, which enclose(s) the resistant strain gauge(s), a force acts between the ring(s) and the component, resulting in additional stiffening of the component. This stiffening can amount, dependent on the component geometry to more than 100% of the original stiffness of the component. The elastic deformation of the component varies, dependent on its stiffness, within the surrounding the component, ring, resulting in changes in resistance of the resistance strain gauge(s), i.e., the measuring data will be adversely affected by mounting of a ring(s). The stiffening influence of a ring(s) cannot be exactly determined as the produced power flux over a ring or rings cannot be quantitatively determined. The power flux changes with each mounting, and the power flux varies with time in accordance with changing relationships in the gap, e.g., resulting from aging of the sealing materials, creeping of the material, contact corrosion, or as a result of a setting process. Proceeding from the presented problem and the drawbacks of the prior art, the object of the invention is to so improve the measuring device of the type described above that the measuring results are not influenced by the measuring device, in particular, by the protective and support rings.

In order to achieve this object, according to the invention, it is proposed to so form the protective ring or rings that it or they is/are supported on the component only from one side or to form the ring or rings deformable with respect to the component. Thereby, no force or torque influences the protective ring, rather the load is completely and exclusively transmitted by the component.

The present invention is embodied in a ring with asymmetrical, with respect to the component, sealing surface, wherein one side of the sealing surface is broad enough to insure a reliable seat of the protective ring or rings on the component and, simultaneously, insures a sealing function with a narrow sealing clearance. The other side of the protective ring/rings is formed as a narrow web that has only a support function but that because of its small dimension, does not transmit any load from the component to the ring or rings.

According to the invention, a broader sealing surface is provided behind the narrow web on its ring side and which with aid of a sealing material having an adequate sealing intensity, protects the resistance strain gauge(s) from penetration of fluids but does not have any direct contact with the component and, therefore, is not subjected to a load applied to the component. With one-sided support of the protective ring or rings, it is insured that the component transmits the entire load at the location the resistance strain gauge is applied to so that no false measuring result is produced.

An alternative solution according to the invention consists informing the ring or rings, which surround(s) the resistance strain gauge(s), deformable, by using constructive measures, or a purposeful selection of a material, or by integrating therein completely or partially elastomeric inserts, so that they have a negligeable stiffness, in comparison with the component, with respect to the applied load. To this end, advantageously, the cross-section of the protective ring or rings is noticeably weakened at one location so that the ring halves of both sealing webs are deformable relative to each other. Alternatively to a constructional solution, the ring can completely or partially be formed of a deformable elastic material. The webs can, in both cases, remain unchanged with respect to previous systems. Ideally, the protective ring is formed of a deformable but elastic material such as polyamide or aluminum. The invention permits to reduce the load portions, which are transmitted by the protective ring or rings, to a negligeable amount and, thereby, to obtain exact and reproducible measurement results.

While at the present state of the Art, the mounting of protective and system—supporting rings leads to an increased falsification of the measurement results because of influence of a power flux transmitted by the component, this drawback is eliminated by using a measuring device according to the invention. The formation of the ring or rings according to the invention insures that a complete load is transmitted by the component itself, whereby the material elongation, which was a basis for design of the measuring system, is determined, at the location of the resistance strain gauge, proportionally to the load. Thereby, as discussed above, the measurement accuracy and the informative capacity of the measurement results are noticeably improved.

Several embodiments of the invention are shown schematically in the drawings and will be described below. The drawings show:

FIG. 1 the inventive measuring device with a protective ring with (a to c) asymmetrical sealing webs for mounting on a component, FIG. 2 the inventive measuring device with a protective ring with (a to h) asymmetrical sealing webs for mounting on a component and with a separate, concentrically arranged support ring, FIG. 3 the inventive measuring device with a protective ring with (a to c) reduced, deformable ring cross-section and conventional sealing webs.

FIGS. 1a–1c show a protective ring 1 which is divided in two halves for gripping a drive shaft (not shown). For mounting, there are provided threaded elements introduced in bores 1a, 1b, 1c, 1d which are provided therefor. The threaded elements provide the forces necessary for gripping mounting of both ring half-shells 2a and 2b on the drive shaft. Upon gripping, broad sealing surfaces 3a and narrow sealing surfaces 3b of the sealing webs 4a and 4b lie on the shaft circumference. The broad sealing web 4 seats sufficiently firmly on the shaft to secure the protective ring against slippage. The narrow sealing web supports the protective ring against the shaft without providing, however, a forcelocking connection. The ring surface 5 adjacent to the narrow web 4b inwardly thereof is spaced by a certain distance from the shaft surface as a result of this support. The resulting empty space is filled during mounting with a sealing mass. The protective ring further includes a recessed circumferential groove 6 in which a sending and/or receiving antenna, generally a copper strip, of an electronic rotor mechanism is received. For insertion of the antenna, an additional recess 7 is provided on the ring surface and in which an antenna cable, which extends from the electronic rotor mechanism, is connected with the antenna. The electronic rotor mechanism is located in a protective metal housing which is secured on a surface 8 provided therefor in the ring interior and is connected by cable with a resistance strain gauge.

FIGS. 2a–2h show an embodiment with a twin-ring construction, with the rings 9, 10 arranged concentrically one above the other. For mounting, threaded elements are used which are introduced in provided therefor, bores 11a–11d for the inner ring 9 and bores 12a–2d for the outer ring 10. The threaded elements provide forces necessary for gripping mounting of the inner ring half-shells 9a and 9b on the drive shaft and/or the outer ring half-shells 10a and 10b on the inner ring 10. Upon mounting of the inner ring 9 on the shaft, the broad sealing surfaces 13a and narrow sealing surfaces 13b of the sealing webs 14a and 14b of the inner ring 9 lie on the shaft circumference. The broad sealing web 14a seats sufficiently firmly on the shaft to secure the ring 9 against. The narrow sealing web 14b supports the ring on the shaft, without providing, however, a forcelocking connection. The inner ring surface 15 between the webs is spaced by a certain distance from the shaft surface as a result of this support. The resulting empty space is filled with a filling mass during mounting.

The outer ring with the ring half-shells 10a and 10b contains a recessed circumferential groove 16 in which a sending and/or receiving antenna, generally a copper strip, of an electronic rotor mechanism is received. For insertion of the antenna, an additional recess 17 is provided on the ring surface and in which an antenna cable, which extends from the electronic rotor mechanism, is connected with the antenna. The electronic rotor mechanism is located in a protective metal housing which is secured on a surface 18 provided therefor in the ring interior and is connected by cable with a resistance strain gauge that is located in the recess 19. Alternatively, the electronic rotor mechanism can be secured to the inner side of the outer ring. The groove 20, which is provided in the inner ring serves for guiding the cable. The inner ring further includes bordering webs 21 provided on its outer side on both lateral sides. The outer ring is provided with complementary thereto, turns 22. Thereby, an undesired axial displacement of the rings relative to each other is prevented. In addition, on the outer ring, there is provided a rotation-preventing element 23 engaging in a recess 24 in the inner ring.

FIGS. 3a–3c show a single ring which is divided in two halves for gripping a drive shaft (not shown). For mounting, there are provided threaded elements introduced in bores 1a, 1b, 1c, 1d which are provided therefor. The threaded elements provide the forces necessary for gripping mounting of both ring half-shells 2a and 2b on the drive shaft. Upon gripping, both sealing surfaces 3a and 3b of the sealing webs 4a and 4b lie on the shaft circumference. Both sealing webs 4a and 4b seat sufficiently firmly on the shaft to secure the ring against slippage. On its inner side, the protective ring is purposefully weakened by provision of a groove 25 having a support cross-section in the shaft middle section 26 smaller than the shaft cross-section. The ring further includes a recessed circumferential groove 6 in which a sending and/or receiving antenna, generally a copper strip, of an electronic rotor mechanism is received. For insertion of the antenna, an additional recess 7 is provided on the ring surface and in which an antenna cable, which extends from the electronic rotor mechanism, is connected with the antenna. The electronic rotor mechanism is located in a protective metal housing which is secured on a surface 8 provided therefor in the ring interior and is connected by cable with a resistance strain gauge.

REFERENCE NUMERALS 1 protective ring
1a, 1b, 1c, 1d Bores for threaded elements
2a, 2b Ring half-shells
3a Broad sealing surface
3b Narrow sealing surface
4a Broad sealing web
4b Narrow sealing web
5 Inner ring surface
6 Recessed groove
7 Recess for antenna
8 Surface for electronic rotor mechanism
9a, 9b Ring half-shells of the inner ring
10a, 10b Ring half shells of the outer ring
11a to 11d Bores for threaded elements
12a to 12d Bores for threaded elements
13a Broad sealing surface
13b Narrow sealing surface
14a Broad sealing web
14b Narrow sealing web
15 Ring surface
16 Recessed groove
17 Recess
18 Surface for electronic rotor mechanism
19 Recess for resistance strain gauge
20 Circumferential groove for guiding the cable
21 Bordering webs
22 Turns
23 Rotation-preventing element
24 Recess for the rotation-preventing element
25 Weakening groove
26 Shaft middle section

The invention claimed is:

1. A measuring device for detecting loads, especially torque, bending moment, and axial force applied to rotating components such as shafts, spindles, and/or pins with which changes in length caused by load are measured and determined in a non-contact manner with aid of a least one resistance strain gauge fixed on the component, wherein for a non-contact feeding of supply energy for the resistance strain gauge and likewise non-contact transmission of measured values to an evaluation device, an electronic rotor mechanism is provided which is arranged in one or several protective ring(s) that encompasses the resistance strain gauge, characterized in that the protective ring(s) has (have) two, spaced from each other, sealing webs (4a, 4b) firmly secured on a rotating component for preventing the protective ring(s) from slippage, and in that the protective ring(s) is (are) formed of two halves, and a cross-section of the protective ring between the two sealing webs is weakened, whereby the ring is deformable relative to a component, and the ring halves are deformable to a different extent upon non-uniform application of a load to the ring.

2. A measuring device according to claim 1, characterized in that a plurality of protective rings (9, 10) are arranged concentrically one above the other or axially next to each other about the component.

3. A measuring device according to claim 1, characterized in that for protection from environmental influences, the electronic rotor mechanism is arranged in the inner one of the protective rings.

4. A measuring device according to claim 1, characterized in that the sending and receiving antenna of the electronic rotor mechanism is arranged in a circumferential recessed groove (6) of the protective ring, with the antenna being removable from this groove (6) for dismounting, i.e, for opening the protective ring.

5. A measuring device according to claim 1, characterized in that weakening of the cross-section of the protective ring(s) is (are) effected by reduction of the ring cross-section, by a purposeful selection of material, or by a complete or partial integration of elastomeric inserts.

6. A measuring device according to claim 1, characterized in that the two halves (2a, 2b) are secured about the component and are released therefrom by using threaded elements and/or hinges.

* * * * *